(12) United States Patent
Miller

(10) Patent No.: US 10,336,347 B2
(45) Date of Patent: Jul. 2, 2019

(54) RAILROAD WELL CAR WITH OPEN TRUSS SIDES

(71) Applicant: JAC Operations, Inc, Chicago, IL (US)

(72) Inventor: Keith Alan Miller, Schererville, IN (US)

(73) Assignee: JAC OPERATIONS, INC., Chicago, IL (US)

( * ) Notice: Subject to any disclaimer, the term of this patent is extended or adjusted under 35 U.S.C. 154(b) by 620 days.

(21) Appl. No.: 14/313,969

(22) Filed: Jun. 24, 2014

(65) Prior Publication Data

US 2014/0305332 A1    Oct. 16, 2014

Related U.S. Application Data

(63) Continuation of application No. 13/153,879, filed on Jun. 6, 2011, now Pat. No. 8,757,067, which is a continuation-in-part of application No. 12/122,184, filed on May 16, 2008, now Pat. No. 7,954,437.

(60) Provisional application No. 60/938,525, filed on May 17, 2007.

(51) Int. Cl.
  *B61D 17/00* (2006.01)
  *B61D 3/20* (2006.01)
  *B61F 3/12* (2006.01)

(52) U.S. Cl.
  CPC .............. *B61D 17/00* (2013.01); *B61D 3/20* (2013.01); *B61F 3/12* (2013.01); *Y02T 30/30* (2013.01)

(58) Field of Classification Search
  CPC .......... B61D 3/20; B61D 3/184; B61D 17/00; B61D 45/007; B61F 1/10
  USPC ................................ 105/355, 404, 407, 413
  See application file for complete search history.

(56) References Cited

U.S. PATENT DOCUMENTS

| | | | |
|---|---|---|---|
| 1,696,332 A | 12/1928 | Sheehan | |
| 3,357,371 A | 12/1967 | Gutridge | |
| 4,091,742 A | 5/1978 | Cordani | |
| 4,452,147 A | 6/1984 | Jwuc | |
| 4,456,413 A | 6/1984 | Pavlick | |
| 4,524,699 A | 6/1985 | Pavlick | |
| 4,599,949 A * | 7/1986 | Hill ............................... | 105/355 |
| 4,686,907 A | 8/1987 | Woollam et al. | |
| 4,703,699 A | 11/1987 | Hill | |
| 4,750,431 A | 6/1988 | Yates et al. | |
| 4,771,706 A | 9/1988 | Lindauer et al. | |
| 4,782,762 A | 11/1988 | Johnstone et al. | |

(Continued)

*Primary Examiner* — Zachary L Kuhfuss
(74) *Attorney, Agent, or Firm* — Blynn L. Shideler; Krisanne Shideler; BLK Law Group

(57) ABSTRACT

A railroad well car includes a spaced trucks grouped in pairs, and a railcar body supported on a pair of the trucks, the body comprising a pair of spaced end structures, each end structure supported on one truck, and a well structure extending between the end structures. The well structure comprises a pair of top chord members extending between the end structures; a pair of side sills extending between the end structures; a pair of end chords extending between the side sills; four corner container support members, each secured to one end chord and one side sill; a plurality of floor beams extending between the side sills forming at least a portion of a floor for the well structure; and a plurality of side truss members extending between one side sill and one top chord on each side forming an open truss side for the well structure.

20 Claims, 5 Drawing Sheets

(56) References Cited

U.S. PATENT DOCUMENTS

| | | | |
|---|---|---|---|
| 4,805,539 A | 2/1989 | Ferris et al. | |
| 4,807,722 A | 2/1989 | Jamrozy et al. | |
| 4,838,744 A | 6/1989 | Bakka et al. | |
| 4,862,810 A | 9/1989 | Jamrozy et al. | |
| 4,876,968 A | 10/1989 | Lindauer et al. | |
| 4,889,055 A | 12/1989 | Jamrozy et al. | |
| 4,893,567 A | 1/1990 | Hill et al. | |
| 4,905,608 A | 3/1990 | Terlecky et al. | |
| 4,909,157 A | 3/1990 | Jamrozy et al. | |
| 4,949,646 A | 8/1990 | Jamrozy et al. | |
| 5,001,990 A | 3/1991 | Pavlick | |
| 5,017,066 A | 5/1991 | Tylisz et al. | |
| 5,054,403 A * | 10/1991 | Hill et al. | 105/419 |
| 5,074,725 A | 12/1991 | Pavlick | |
| 5,085,152 A * | 2/1992 | Tylisz et al. | 105/419 |
| 5,170,718 A | 12/1992 | Hill et al. | |
| 5,216,956 A | 6/1993 | Adams, Jr. | |
| 5,279,230 A | 1/1994 | Thomas et al. | |
| 5,379,702 A | 1/1995 | Saxton et al. | |
| 5,423,269 A | 6/1995 | Saxton et al. | |
| 5,452,664 A | 8/1995 | Richmond | |
| 5,465,670 A | 11/1995 | Butcher | |
| 5,511,490 A | 4/1996 | Fendall et al. | |
| 5,611,285 A | 3/1997 | Saxton | |
| 5,730,063 A | 3/1998 | Forbes et al. | |
| 6,003,445 A | 12/1999 | Coslovi et al. | |
| 6,196,137 B1 | 3/2001 | Forbes | |
| 6,505,564 B2 | 1/2003 | Khattab | |
| 6,584,912 B2 | 7/2003 | Forbes | |
| 6,647,895 B2 | 11/2003 | Saxton et al. | |
| 6,736,071 B2 | 5/2004 | Engle | |
| 6,877,226 B2 | 4/2005 | Khattab | |
| 7,047,889 B2 | 5/2006 | Forbes | |
| 7,654,206 B2 * | 2/2010 | Saxton | 105/411 |
| 7,757,610 B2 * | 7/2010 | Saxton et al. | 105/404 |
| 7,954,437 B2 | 6/2011 | Miller | |
| 8,757,067 B2 | 6/2014 | Miller | |
| 2001/0010198 A1 | 8/2001 | Forbes | |
| 2002/0073889 A1 | 6/2002 | Khattab | |
| 2002/0174799 A1 | 11/2002 | Khattab | |
| 2006/0171791 A1 | 8/2006 | Nichols | |

* cited by examiner

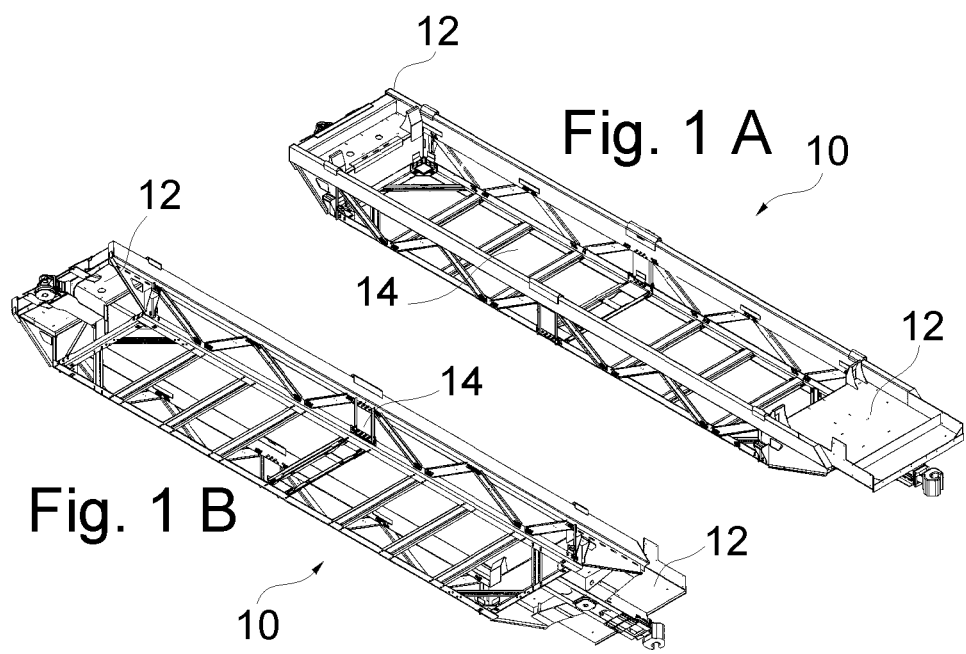
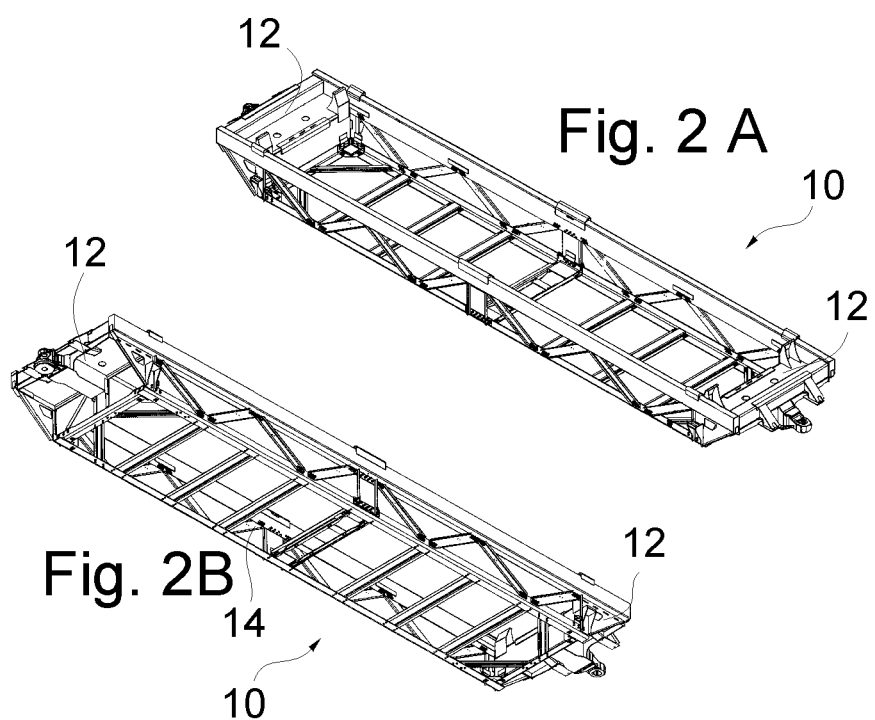

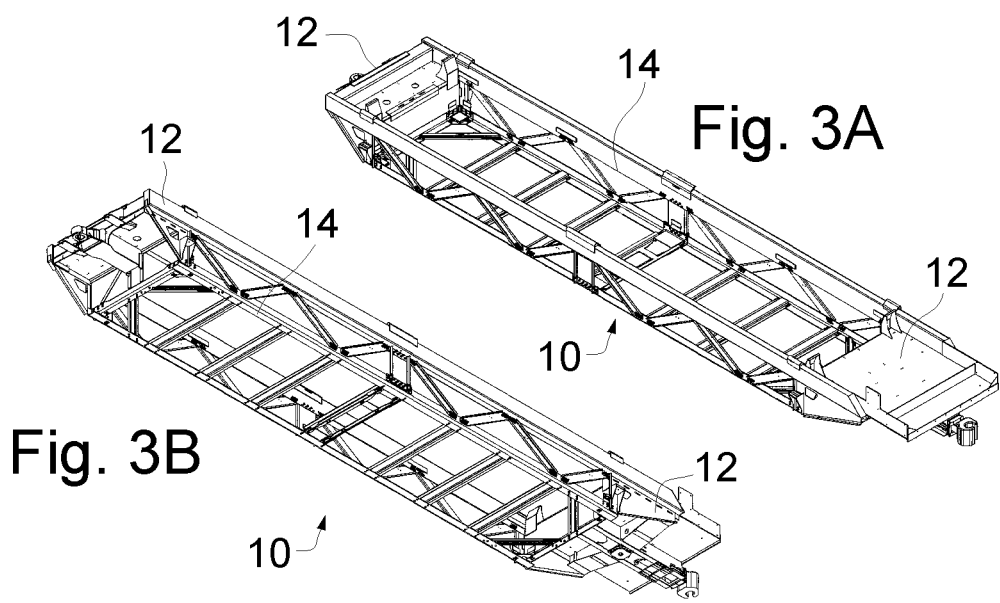

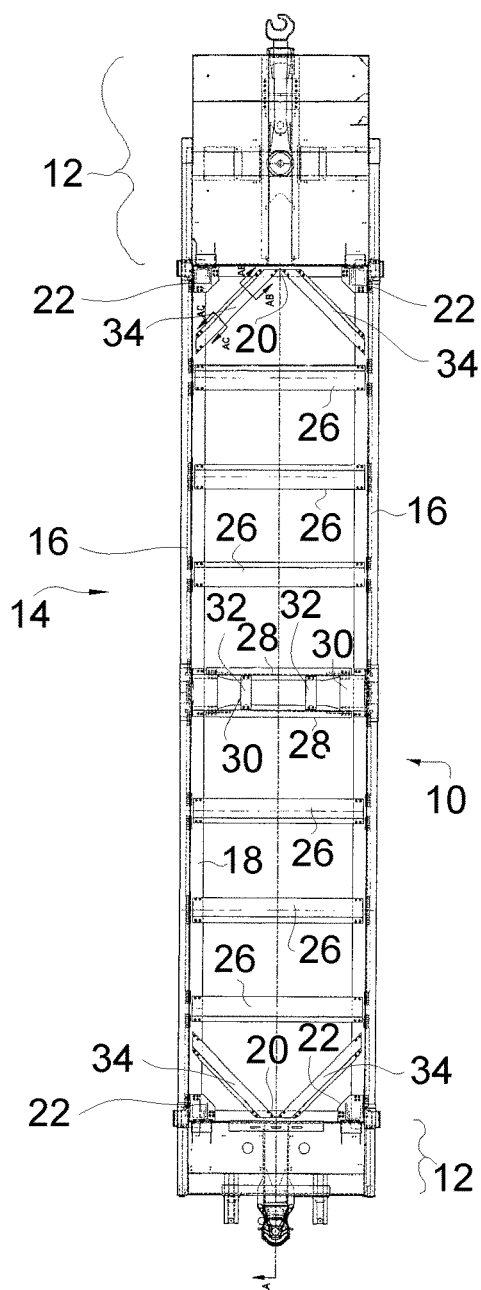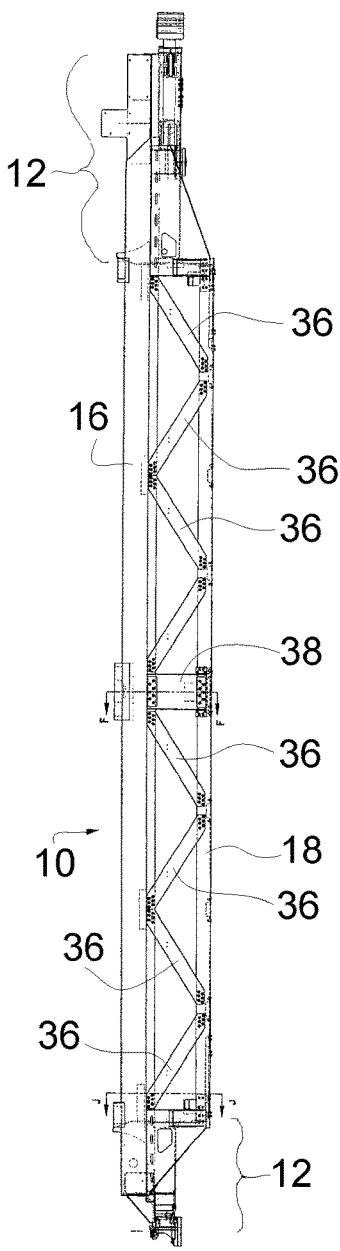
Fig. 4A
Fig. 4B

RAILROAD WELL CAR WITH OPEN TRUSS SIDES

RELATED APPLICATION

The present application is a continuation of parent application Ser. No. 13/153,879 filed Jun. 6, 2011 entitled "Railroad Well Car with Open Truss Sides" which published Jun. 7, 2012 as publication number 2012-0137925, now U.S. Pat. No. 8,757,067. The parent application Ser. No. 13/153,879 is a continuation in part of patent application Ser. No. 12/122,184 filed May 16, 2008 entitled "Railroad Well Car With Open Truss Sides" which published Nov. 20, 2008 as publication number 2008-0282929, now U.S. Pat. No. 7,954,437 and patent application Ser. No. 12/122,184 claims the benefit of U.S. Provisional Patent Application Ser. No. 60/938,525 entitled "Railroad Well Car with Open Truss Sides" filed May 17, 2007. The above identified published applications and issued patents are incorporated herein by reference.

BACKGROUND OF THE INVENTION

1. Field of the Invention

The present invention relates to a railroad well car, and more particularly to a well construction for a double stack container well car.

2. Background Information

The transportation of intermodal containers on railcars has been a common practice for several decades. The sizes and capacities of the containers have increased in time, however the Intermodal cargo containers have now been standardized in various lengths such as, most commonly, 20, 40, and 53 feet. Intermodal cargo containers have also been standardized in width as well.

The prior art has provided a variety of railroad freight cars adapted to carry intermodal cargo containers. Typically, such railcars are capable of carrying various configurations of different sized intermodal cargo containers. At times, a stacked arrangement of such cargo containers is employed. One type of container railcar in use is referred to as a well car, since it has a container-receiving well structure between the wheeled trucks which support each end of the well car. The body of the well car is generally at a low height, with containers in the bottom tier of a double-stacked container arrangement being supported approximately 10 inches above rail in a loaded car. The side wall structures of such well cars are generally formed as a plurality of internal or external side stakes and side sheets extending between the top chord and the side sill forming a substantially closed side wall structure.

There remains a need for lighter weight well cars that can thereby increase the carrying capacity of the associated car and/or fuel savings in the operation of the railcar. Further there is a need to provide for external inspection of a loaded well car. Further there is a need to provide a well car that can be easily manufactured and serviced.

SUMMARY OF THE INVENTION

It is an object of the present invention to provide a well car, particularly a double stack container well car for 20 and 40 foot containers, having open truss sides. It is an object of the present invention to provide a well car, particularly a double stack container well car for 20 and 40 foot containers, which utilizes mechanically fastened frame members.

One embodiment of the present invention provides a container well car comprising a pair of spaced trucks, and a railcar body supported on the trucks, the body comprising a pair of spaced end structures, each end structure supported on one truck, and a well structure extending between the end structures. The well structure comprises a pair of top chord members extending between the end structures; a pair of side sills extending between the end structures; a pair of end chords extending between the side sills, one at each end of the well structure; four corner container support members, each secured to one end chord and one side sill at four corners of the well structure; a plurality of floor beams extending between the side sills forming at least a portion of a floor for the well structure; and a plurality of side truss members extending between one side sill and one top chord on each side forming an open truss side for the well structure.

These and other advantages of the present invention will be clarified in the brief description of the preferred embodiment taken together with the drawings in which like reference numerals represent like elements throughout.

BRIEF DESCRIPTION OF THE DRAWINGS

FIG. 1A is a perspective top view of a railcar body of a container well car according to one aspect of the present invention;

FIG. 1B is a perspective bottom view of the railcar body of FIG. 1A;

FIG. 2A is a perspective top view of a railcar body of a container well car according to another aspect of the present invention;

FIG. 2B is a perspective bottom view of the railcar body of FIG. 2A;

FIG. 3A is a perspective top view of a railcar body of a container well car according to another aspect of the present invention;

FIG. 3B is a perspective bottom view of the railcar body of FIG. 2A;

FIG. 4A is a top plan view of the railcar body of FIG. 1A;

FIG. 4B is a side elevation view of the railcar body of FIG. 4A;

DESCRIPTION OF THE PREFERRED EMBODIMENTS

The present invention provides a double stack container well car for 20 and 40 foot containers, having open truss sides and which utilizes mechanically fastened frame members. The container well car according to the present invention comprises a conventional pair of spaced trucks 8 (not shown in FIGS. 1-10 for clarity, see FIGS. 11-16), and a railcar body 10 supported on the trucks 8. The design of the trucks 8 is known in the art and not further detailed in this disclosure.

Figure 13:
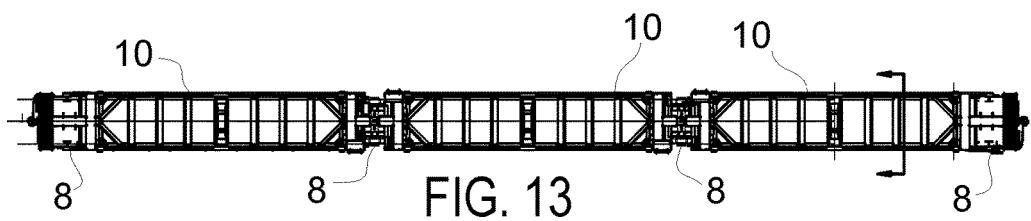
FIG. 13 is a top plan view of a three unit or three body version of a container well car according to one aspect of the present invention.
Figure 14:
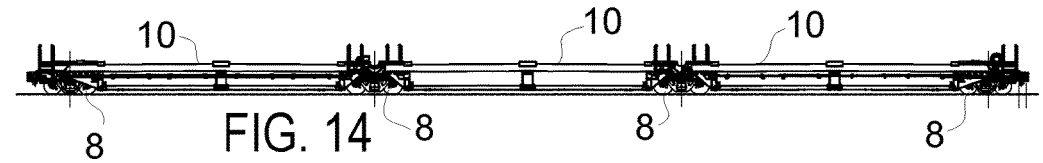
FIG. 14 is a side elevation view of the container well car of FIG. 13.
Figure 15:
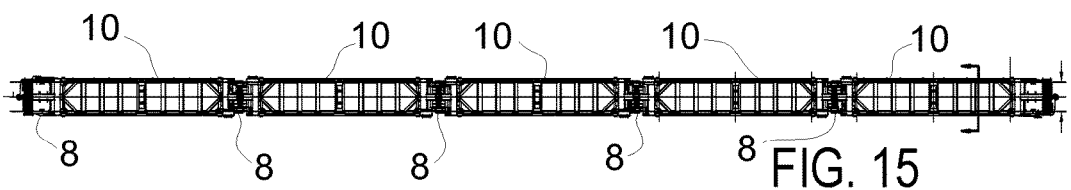
FIG. 15 is a top plan view of a five unit or five body version of a container well car according to one aspect of the present invention.
Figure 16:
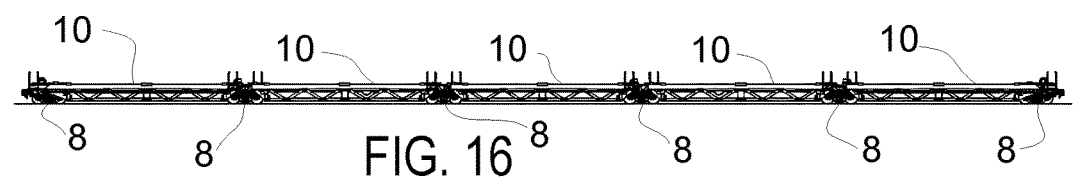
FIG. 16 is a side elevation view of the container well car of FIG. 15.

The body 10 comprising a pair of spaced end structures 12 with each end structure supported on one truck 8, and a well structure 14 extending between the end structures 12. FIGS. 1A and 1B illustrate a well car according to one aspect of the present invention and this well car is an "end unit" well car according to the present invention. FIGS. 2A and 2B illustrate a well car according to another aspect of the present invention and this well car is an "intermediate unit" well car according to the present invention. FIGS. 3A and 3B illustrate a well car according to one aspect of the present invention and this well car is an "end unit" well car according to the present invention. The difference between the well cars of FIGS. 1, 2 and 3 rest in the configuration of the end structures 12. The intermediate unit of FIGS. 2A and 2B is intended to share the trucks with adjacent well cars (as shown in the three and five unit embodiments of FIGS. 13-16). These different end structure 12 configurations allow for a series of well cars according to the present invention to be provided in series. One unit, three unit and five unit cars are shown in FIGS. 13-16 but the present design can be implemented into a railcar have any desired number of units or bodies 10. Essentially, except for the single unit or single body 10 configuration of FIGS. 11-12, a line of three or more rail cars bodies 10 according to the present invention will be provided with an end unit rail car of FIG. 1 or 3 followed by one or more intermediate well cars of FIG. 2 followed by a final end rail car of FIG. 3 or 1 (opposite of the lead end railcar). The use of intermediate and end unit rail cars, as desired, will be understood by those of ordinary skill in the art and are represented in FIGS. 13-14. The end structures 12 will be formed in a generally conventional fashion to accommodate the appropriate loading and forces on the rail car of the present invention.

The well structure 14 of the rail cars of FIGS. 1-3 are the same between the rail cars and this structure is described in detail in connection with FIGS. 4-10 below.

The well structure 14 includes a pair of top chord members 16 extending between and attached to the end structures 12. The top chord members 16 are steel tube members that may be around 14"×6" and around ¼" thick.

The well structure 14 includes a pair of side sills 18 extending between the end structures 12. The side sills 18 are formed of steel 8"×8" angles about ⅝" thick.

The well structure 14 includes a pair of end chords 20 extending between the side sills 18, one at each end of the well structure 12. The end chords 20, like the side sills 18, may also be conveniently formed of steel angles. The end chords 20 mark the transition between the well structure 14 and the end structures 12.

Figure 5:
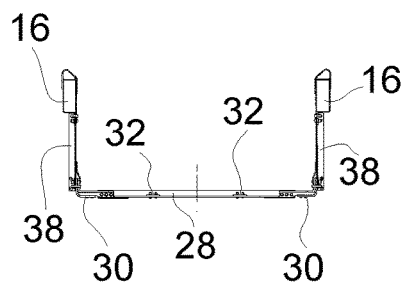
FIG. 5 is a section view of the railcar body of FIG. 4A.
Figure 6:
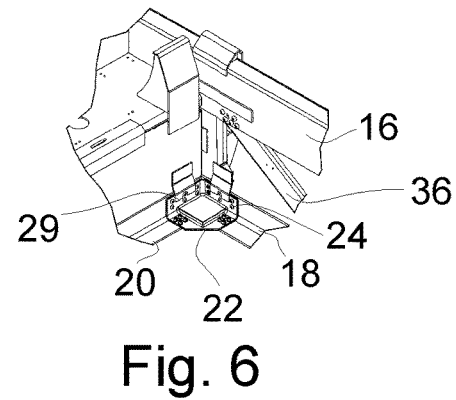
FIG. 6 is an enlarged perspective view of a corner container support member in the railcar body of FIG. 4A.

The well structure 14 includes four corner container support members 22, each secured to one end chord 20 and one side sill 18 at four corners of the well structure 14, as shown in FIG. 6. Each corner container support member is a steel casting that is positioned to support a container therein. Mechanical fasteners 29 and 24 are used to secure the corner container support member to the end chord 20 and the side sill 18, generally as shown.

Figure 7:
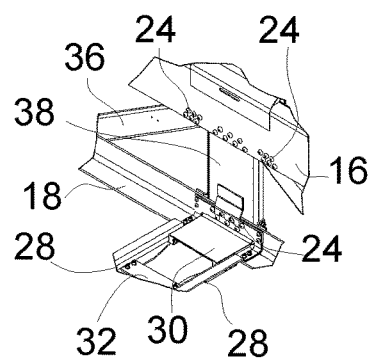
FIG. 7 is an enlarged perspective view of a center container support member in the railcar body of FIG. 4A.
Figure 9:
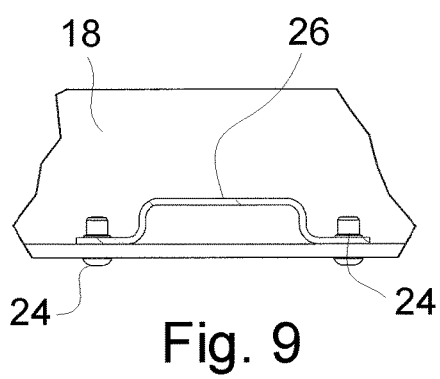
FIG. 9 is an enlarged section view of a floor beam in the railcar body of FIG. 4A.
Figure 10:
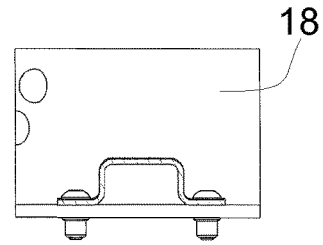
FIG. 10 is an enlarged section view of a end floor beam in the railcar body of FIG. 4A.
Figure 11:
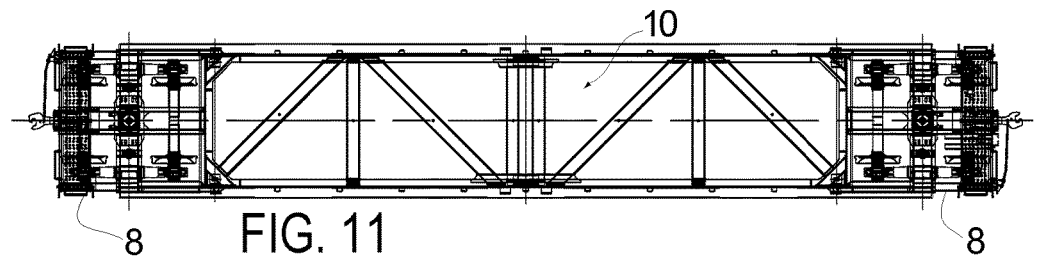
FIG. 11 is a top plan view of a single unit or single body version of a container well car according to one aspect of the present invention.
Figure 12:
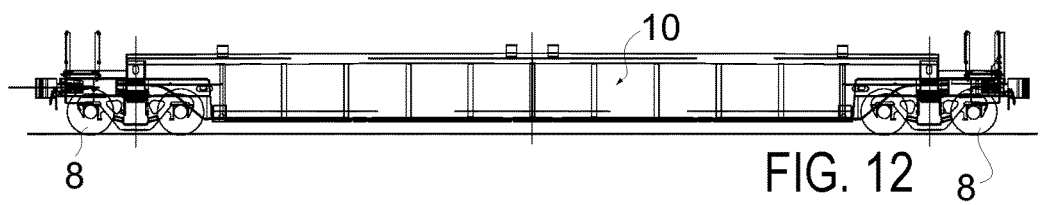
FIG. 12 is a side elevation view of the container well car of FIG. 11.

The well structure 14 includes a plurality of steel floor beams 26 and 28 extending between the side sills 18 forming at least a portion of a floor for the well structure 12. Mechanical fasteners 24 are used to secure the floor beams 26 and 28 to the side sills 18 as shown in FIGS. 7 and 9. Floor beams 26 are hat shaped steel members and center beams 28 are steel angles.

Figure 8:
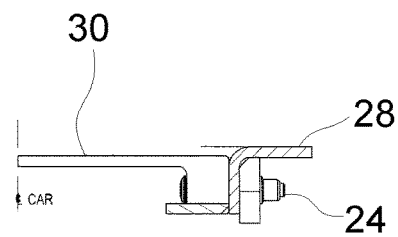
FIG. 8 is an enlarged section view of a center container support member in the railcar body of FIG. 4A.

The well structure 14 includes a pair of center container support members 30, each secured between the pair of center floor beams 28 and a side sill 18 at a longitudinal center of the well structure 14. Each center container support member is a steel casting that is positioned to support containers therein, and is provided to accommodate two 20 foot containers within the well structure 14. Mechanical fasteners 24 are used to secure the center container support member 30 to the center floor beams 28 and the side sill 18, generally as shown in FIGS. 7 and 8. The use of castings for the support members 30 and 22 significantly reduces the susceptibility to fatigue cracking as would be apparent in a similar welded construction.

The well structure 14 includes a pair of center beam cross members 32, each secured between the pair of center floor beams 28. Mechanical fasteners 24 are used to secure the steel center beam cross members 32 to the center floor beams 30.

The well structure 14 includes a pair of end floor beams 34 at each end chord 20, with each steel end floor beam 34 extending from the end chord 20 to one side sill 18. Mechanical fasteners 24 secure the steel end floor beams 34 to the associated end chord 20 and side sill 18.

The well structure 14 includes a plurality of side truss members 36 and 38 extending between one side sill 18 and one top chord 16 on each side forming an open truss side for the well structure 12. The diagonal side truss members 36 are ¼" steel members that are secured with mechanical fasteners. A vertical truss member 38 is aligned with the center container support member 30 and is secured with mechanical fasteners 24. The side of the well structure 12 is open in that no side sheet is required and the well interior can be visually inspected from the outside without having to climb onto the car. Additionally, the open sides provide access to the interior of the well structure.

The use of mechanical fasteners for the well structure construction will decrease assembly labor costs and maintenance costs and will reduce these components to fatigue cracking.

Further, the open side design of the present invention will lighten the overall weight of the car allowing for a higher carrying capacity for the railcar of the invention and/or fuel savings in the operation of the railcar.

Although the present invention has been described with particularity herein, the scope of the present invention is not limited to the specific embodiment disclosed. It will be apparent to those of ordinary skill in the art that various modifications may be made to the present invention without departing from the spirit and scope thereof. The scope of the present invention should be defined by the appended claims and equivalents thereto.

What is claimed is:

1. A railroad double stack container well car comprising:
a plurality of spaced trucks;

at least one railcar body supported on a pair of the trucks, each body comprising a pair of spaced end structures, each end structure supported on one truck, and a well structure extending between the end structures, wherein the well structure comprises
  (i) a pair of top chord members extending between the end structures;
  (ii) a pair of side sills extending between the end structures;
  (iii) a pair of end chords extending between the side sills, one at each end of the well structure;
  (iv) four corner container support members, each secured to one end chord and one side sill at four corners of the well structure and each having a lower planar load supporting structure, wherein each support member is a casting and each lower planar load supporting structure extending inwardly beyond the associated end chord and side sill; and
  (v) a plurality of side truss members extending between one side sill and one top chord on each side.

2. The railroad well car according to claim 1 further including a pair of center container support members, each secured to a side sill at a longitudinal center of the well structure.

3. The railroad well car according to claim 2 wherein the side truss members for each side form an open side and which includes a vertical truss member aligned with a center container support member.

4. The railroad well car according to claim 3 wherein mechanical fasteners secure the side truss members extending between one side sill and one top chord.

5. The railroad well car according to claim 4 wherein mechanical fasteners secure the corner container support members to an associated end chord and side sill.

6. The railroad well car according to claim 5 further including a pair of end floor beams at each end chord, with each end floor beam extending from the end chord to a side sill.

7. The railroad well car according to claim 6 wherein mechanical fasteners secure the end floor beams to the associated end chord and side sill.

8. The railroad well car according to claim 7 further including a plurality of floor beams extending between the side sills forming at least a portion of a floor for the well structure.

9. The railroad well car according to claim 1 wherein mechanical fasteners secure the corner container support members to an associated end chord and side sill.

10. The railroad well car according to claim 9 further including a pair of end floor beams at each end chord, with each end floor beam extending from the end chord to a side sill.

11. The railroad well car according to claim 10 wherein mechanical fasteners secure the end floor beams to the associated end chord and side sill.

12. The railroad well car according to claim 11 further including a plurality of floor beams extending between the side sills forming at least a portion of a floor for the well structure.

13. The railroad well car according to claim 1 wherein the railcar includes at least three railcar bodies and at least four spaced trucks grouped in pairs, wherein each railcar body is supported on one pair of spaced trucks, and wherein at least two trucks are partially supporting two adjacent railcar bodies.

14. The railroad well car according to claim 13 wherein mechanical fasteners secure the corner container support members to an associated end chord and side sill.

15. The railroad well car according to claim 14 further including a pair of end floor beams at each end chord, with each end floor beam extending from the end chord to a side sill.

16. The railroad well car according to claim 15 wherein mechanical fasteners secure the end floor beams to the associated end chord and side sill.

17. The railroad well car according to claim 16 further including a plurality of floor beams extending between the side sills forming at least a portion of a floor for the well structure.

18. A railroad well car comprising:
  a plurality of spaced trucks;
  at least one railcar body supported on the trucks, the body comprising a pair of spaced end structures, each end structure supported on one truck, and a well structure extending between the end structures, wherein the well structure comprises
  (i) a pair of top chord members extending between the end structures;
  (ii) a pair of side sills extending between the end structures;
  (iii) a floor of the well structure extending generally between the side sills;
  (iv) four corner container support members, each secured to one end chord and one side sill at four corners of the well structure and each having a lower planar load supporting structure, wherein each support member is a casting and each lower planar load supporting structure extending inwardly beyond the associated end chord and side sill; and
  (v) a plurality of side truss members extending between one side sill and one top chord on each side forming an open truss side for the well structure whereby the well structure interior can be visually inspected from the outside through the side truss members.

19. The railroad well car according to claim 18 wherein the railcar includes at least three railcar bodies and at least four spaced trucks grouped in pairs, wherein each railcar body is supported on one pair of spaced trucks, and wherein at least two trucks are partially supporting two adjacent railcar bodies.

20. The railroad well car according to claim 13 wherein mechanical fasteners secure the corner container support members to an associated end chord and side sill.

* * * * *